US009392239B2

(12) United States Patent
Asamura et al.

(10) Patent No.: US 9,392,239 B2
(45) Date of Patent: Jul. 12, 2016

(54) MULTI-SCREEN DISPLAY APPARATUS

(71) Applicant: MITSUBISHI ELECTRIC CORPORATION, Tokyo (JP)

(72) Inventors: Yoshinori Asamura, Tokyo (JP); Isao Yoneoka, Tokyo (JP); Noboru Hamaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/727,159

(22) Filed: Jun. 1, 2015

(65) Prior Publication Data

US 2015/0381954 A1    Dec. 31, 2015

(30) Foreign Application Priority Data

Jun. 25, 2014 (JP) ................................. 2014-129922

(51) Int. Cl.
*H04N 5/66* (2006.01)
*H04N 9/12* (2006.01)
*H04N 9/31* (2006.01)

(52) U.S. Cl.
CPC ........... *H04N 9/3179* (2013.01); *H04N 9/3147* (2013.01)

(58) Field of Classification Search
USPC ........... 348/383, 388.1, 429.1, 569, 705, 706, 348/723, 724, 725, 744, 739, 38, 588, 752, 348/750, 189; 345/1.1, 1.3, 504; 725/25, 725/27, 56, 67, 135; 709/208, 209, 211
See application file for complete search history.

(56) References Cited

U.S. PATENT DOCUMENTS

| 4,857,994 | A  | * | 8/1989 | Belmares-Sarabia | H04N 1/6011 |
| | | | | | 348/577 |
| 7,995,248 | B2 | * | 8/2011 | Oguri ................. | H04N 1/00384 |
| | | | | | 358/400 |
| 8,196,167 | B2 | * | 6/2012 | Yuen .................. | H04N 5/44543 |
| | | | | | 725/40 |
| 2005/0044570 | A1 | * | 2/2005 | Poslinski ............. | H04N 5/4401 |
| | | | | | 725/48 |

(Continued)

FOREIGN PATENT DOCUMENTS

| JP | 5-103277 A | 4/1993 |
| JP | 3381796 B2 | 3/2003 |
| JP | 2012-168402 A | 9/2012 |

*Primary Examiner* — Jefferey Harold
*Assistant Examiner* — Mustafizur Rahman
(74) *Attorney, Agent, or Firm* — Birch, Stewart, Kolasch & Birch, LLP

(57) ABSTRACT

In a multi-screen display apparatus according to the present invention, a master image display apparatus acquires determination results obtained by an input detector and acquires a video signal of which channel is selected by a selector from each of a plurality of image display apparatuses including the master image display apparatus. In a case where the selector of any of the image display apparatuses selects a video signal of a channel that is not input to the video receiver, the master image display apparatus controls the selector of the image display apparatus to select a video signal of another channel that is input to the video receiver and controls the selector of at least one of the others of the image display apparatuses to select a video signal of the other channel.

4 Claims, 5 Drawing Sheets

(56) References Cited

U.S. PATENT DOCUMENTS

| | | | |
|---|---|---|---|
| 2005/0117121 A1* | 6/2005 | Meerleer | G06F 3/14 353/30 |
| 2006/0139862 A1* | 6/2006 | Wang | G06F 1/1616 361/679.3 |
| 2007/0070442 A1* | 3/2007 | Ohkubo | H04N 1/00442 358/451 |
| 2007/0141980 A1* | 6/2007 | Lee | H04N 5/44543 455/3.06 |
| 2007/0250867 A1* | 10/2007 | Kuwabara | H04N 5/45 725/75 |
| 2008/0313677 A1* | 12/2008 | Lee | H04N 5/44543 725/56 |
| 2009/0003731 A1* | 1/2009 | Nitta | G06F 3/1423 382/298 |
| 2009/0031349 A1* | 1/2009 | Han | H04N 5/44543 725/39 |
| 2009/0303263 A1* | 12/2009 | Minobe | H04N 5/44591 345/690 |
| 2009/0309897 A1* | 12/2009 | Morita | H04M 1/2535 345/629 |
| 2010/0036878 A1* | 2/2010 | Kim | G06F 17/30781 715/716 |
| 2010/0315436 A1* | 12/2010 | Chan | G06F 3/1431 345/660 |
| 2011/0115983 A1* | 5/2011 | Nishihata | G09G 5/006 348/705 |
| 2012/0133834 A1* | 5/2012 | Han | H04N 7/16 348/569 |
| 2014/0059620 A1* | 2/2014 | Rhoads | H04L 49/9015 725/67 |
| 2014/0063208 A1* | 3/2014 | Fukasawa | A61B 8/466 348/51 |

* cited by examiner

MULTI-SCREEN DISPLAY APPARATUS

BACKGROUND OF THE INVENTION

1. Field of the Invention

The present invention relates to a multi-screen display apparatus and more particularly to the multi-screen display apparatus including a plurality of image display apparatuses aligned to form one screen.

2. Description of the Background Art

A multi-screen display apparatus is known which includes a plurality of display apparatuses combined to form a large screen. For example, in Japanese Patent Application Laid-Open No. 2012-168402, the multi-screen display apparatus is proposed which reconstitutes, in the event of a breakdown of any one of the plurality of display apparatuses that form a large screen, the display system of the multi-screen by detecting the broken video display apparatus through the external control and powering off the unit monitor that is not included in the maximum screen formation information.

The technique is known by which, in a display apparatus including a plurality of input signal ports, the automatic signal switching takes place in the absence of the currently displayed video signal such that a signal of another input signal port is displayed (see, Japanese Patent Application Laid-Open No. 05-103277 (1993)).

The conventional multi-screen display apparatus has controlled, through the external controller, the operation of each of the plurality of display apparatuses that form a multi-screen, requiring the larger apparatus formation. In a case where any one of the display apparatuses fails to receive signals, the video displayed on the multi-screen is, on the whole, partially omitted. Even if the signal switching takes place in the display apparatus receiving no signal such that another signal is displayed, the video displaying of the multi-screen lacks unity on the whole.

SUMMARY OF THE INVENTION

The present invention has an object to provide a multi-screen display apparatus that performs displaying such that the unity of a multi-screen is kept on the whole even if any one of display apparatuses that form the multi-screen fails to receive signals.

In a multi-screen display apparatus according to the present invention, any one of a plurality of image display apparatuses is a master image display apparatus. The master image display apparatus is connected with the plurality of image display apparatuses other than the master image display apparatus. Each of the plurality of image display apparatuses includes: a video receiver that receives an input of video signals of a plurality of channels; an input detector that determines the presence or absence of input to the video receiver for each of the video signals of the plurality of channels; a selector that selects a video signal of one of the plurality of channels; and a display that displays a video signal of the channel selected by the selector. The master image display apparatus acquires determination results obtained by the input detector and acquires a video signal of which channel is selected by the selector from each of the plurality of image display apparatuses including the master image display apparatus. In a case where the selector of any of the image display apparatuses selects a video signal of a channel that is not input to the video receiver, the master image display apparatus controls the selector of the image display apparatus to select a video signal of another channel that is input to the video receiver and controls the selector of at least one of the others of the image display apparatuses to select a video signal of the other channel.

In a case where the transmission of video signal is stopped in any one of the plurality of image display apparatuses, the multi-screen display apparatus according to the present invention switches the video signal of the image display apparatus to the video signal of another channel and switches the video signal of at least one of the other image display apparatuses to a video signal of the same channel. Thus, even if the transmission of video signal is stopped in any one of the plurality of image display apparatuses, another video signal can be displayed while the unity is maintained for the multi-screen on the whole.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Configuration

Figure 1:
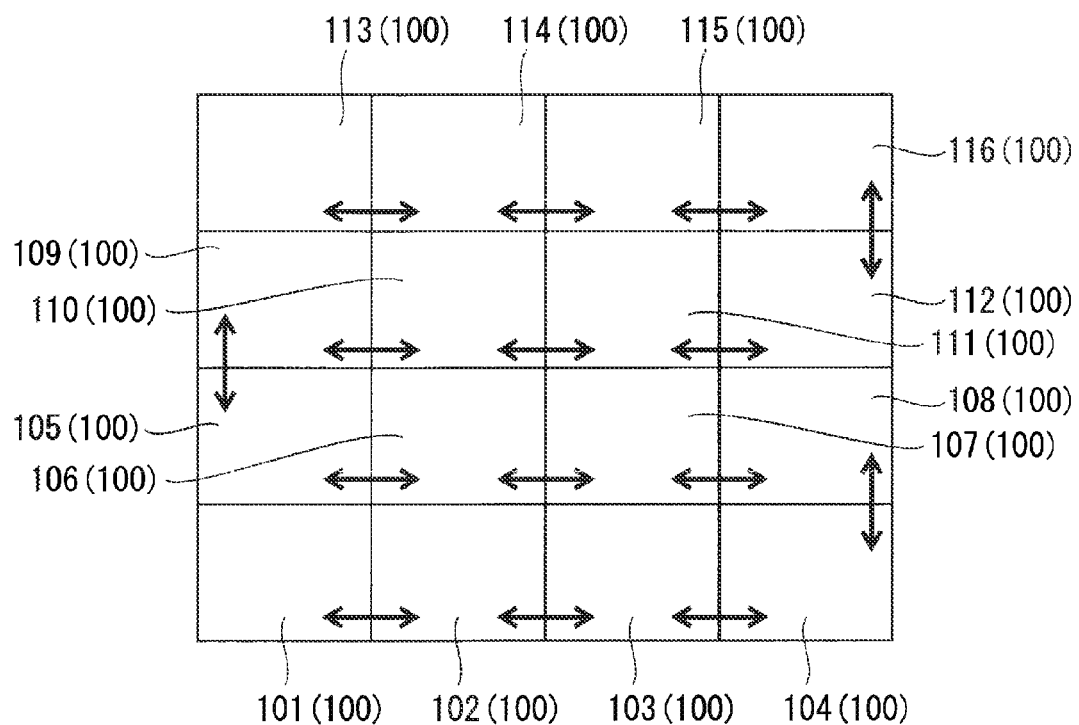
FIG. 1 illustrates a screen configuration of a multi-screen display apparatus according to a first preferred embodiment.

FIG. 1 illustrates a screen configuration of a multi-screen display apparatus according to a first preferred embodiment. As shown in FIG. 1, the multi-screen display apparatus includes, for example, sixteen image display apparatuses and the screens of these image display apparatuses are combined to form a large screen. The sixteen image display apparatuses are made up of a master image display apparatus 101 and fifteen slave image display apparatuses 102 to 116. The image display apparatuses are herein simply referred to as image display apparatuses 100 as long as a description is given with no distinction between the master image display apparatus 101 and the slave image display apparatuses 102 to 116.

Figure 2:
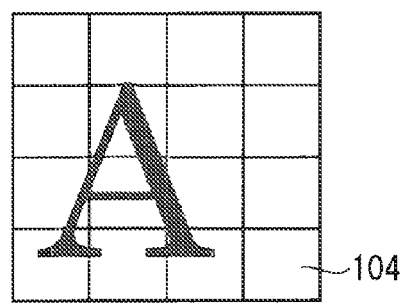
FIG. 2 illustrates a display example of the multi-screen display apparatus according to the first preferred embodiment.
Figure 3:
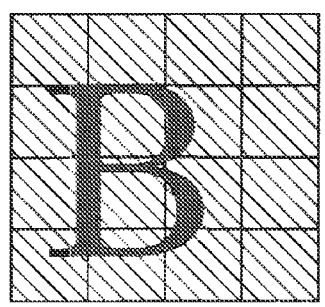
FIG. 3 illustrates a display example of the multi-screen display apparatus according to the first preferred embodiment.
Figure 4:
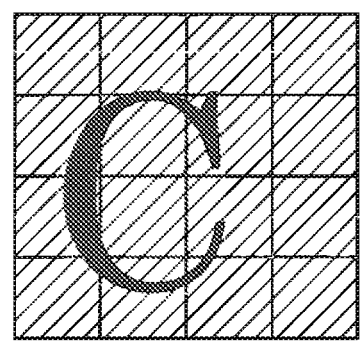
FIG. 4 illustrates a display example of the multi-screen display apparatus according to the first preferred embodiment.
Figure 5:
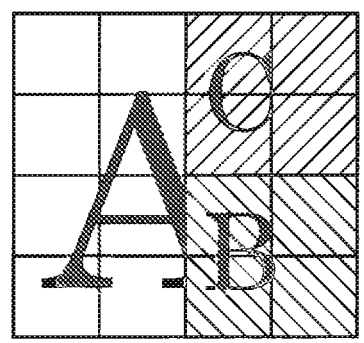
FIG. 5 illustrates a display example of the multi-screen display apparatus according to the first preferred embodiment.

As shown in FIGS. 2, 3, and 4, the video input into the multi-screen display apparatus can be displayed by the multi-screen display apparatus as a whole. Furthermore, as shown in FIG. 5, the display surface of the multi-screen display apparatus can be divided into a plurality of areas, so that different kinds of video are displayed on the respective areas through display switching. The plurality of image display apparatuses that form the multi-screen display apparatus are connected in series through communication cables (arrows shown in FIG. 1). Such configuration allows the transmission and reception of control information described below between the image display apparatuses.

Figure 6:
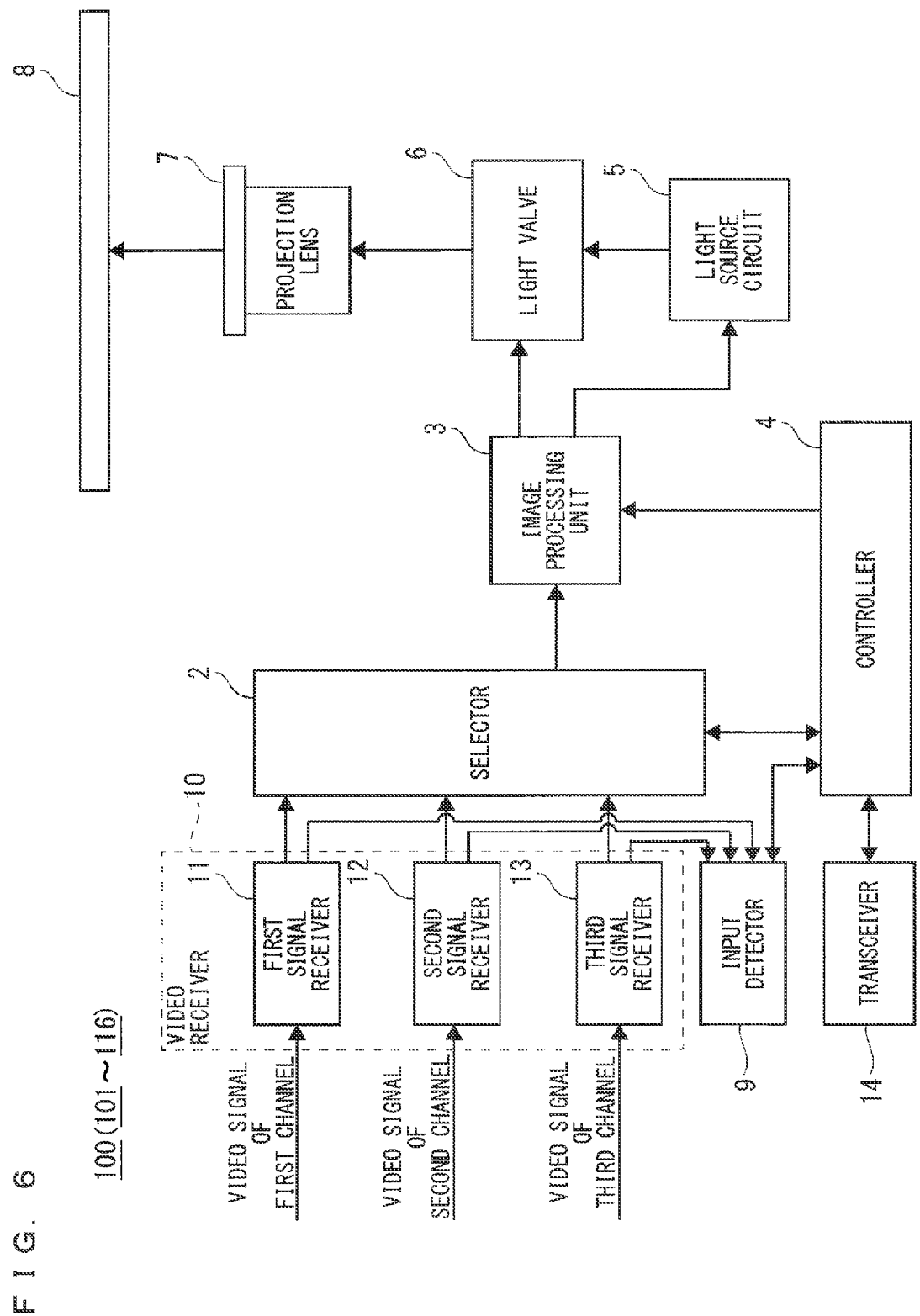
FIG. 6 is a block diagram of one of display apparatuses that form the multi-screen display apparatus according to the first preferred embodiment.

FIG. 6 is a block diagram showing a configuration of the image display apparatuses 100 according to the first preferred embodiment. As shown in FIG. 6, each of the image display apparatuses 100 is a projection video display apparatus and includes, for example, LEDs as the light source.

The image display apparatus 100 includes a video receiver 10, a first signal receiver 11, a second signal receiver 12, a third signal receiver 13, an input detector 9, a selector 2, a display, a transceiver 14, a controller 4, and an image processing unit 3. The video receiver 10 includes the first, second, and third signal receivers 11, 12, and 13. The first, second, and third signal receivers 11, 12, and 13 receive an input of video signals of three channels, one channel for each signal receiver. The input detector 9 determines whether video signals are input to the first, second, and third signal receivers 11, 12, and 13. The selector 2 selects a video signal of one of the plurality of channels input to the first, second, and third signal receivers 11, 12, and 13, and then, outputs the video signal to the image processing unit 3. The selector 2 detects information on the resolution of each video signal.

The display displays a video signal of the channel selected by the selector 2. The display includes, for example, a light source circuit 5, a light valve 6, a projection lens 7, and a screen 8. The light source circuit 6 is, for example, an LED or a laser. The light valve 6 is, for example, a liquid crystal panel or a digital micromirror device (DMD).

The image processing unit 3 performs the signal processing of, for example, enlarging and reducing video signals and converting the frame rate. In addition, the image processing unit 3 converts the resolution of the signals into a predetermined resolution, to thereby convert the signals into the drive signals for driving the light valve 6. The light valve 6 modulates the intensity of the light output from the light source circuit 5 on the basis of the drive signals and outputs the light to the projection lens 7. The projection lens 7 projects the video light onto the screen 8. The light output from the light source circuit 5 is subjected to the control of light-emission timing and light-emission luminance by the image processing unit 3, and then, is input to the light valve 6.

The controller 4 controls the selection of video signal in the selector 2 and controls the enlargement processing system for video signal in the image processing unit 3 in accordance with the determination results, detected by the input detector 9, of the presence or absence of video signals of three channels and with the information on the resolution detected by the selector 2. In addition, the controller 4 allows the transmission and reception of the control information between the image display apparatuses 100 via the transceiver 14.

According to the first preferred embodiment, the sixteen image display apparatuses 100 that form the multi-screen display apparatus are connected in series by the communication cables via the transceiver 14 included in each of the image display apparatuses.

The master image display apparatus 101 regularly receives, from the slave image display apparatuses 102 to 116, the determination results of the presence or absence of video signals. The master image display apparatus 101 decides a video signal of which channel is displayed in common by the multi-screen display apparatus as a whole. Then, the master image display apparatus 101 transmits, in accordance with the decided channel, the switching control command to the slave image display apparatuses 102 to 116.

<Operation>

Figure 7:
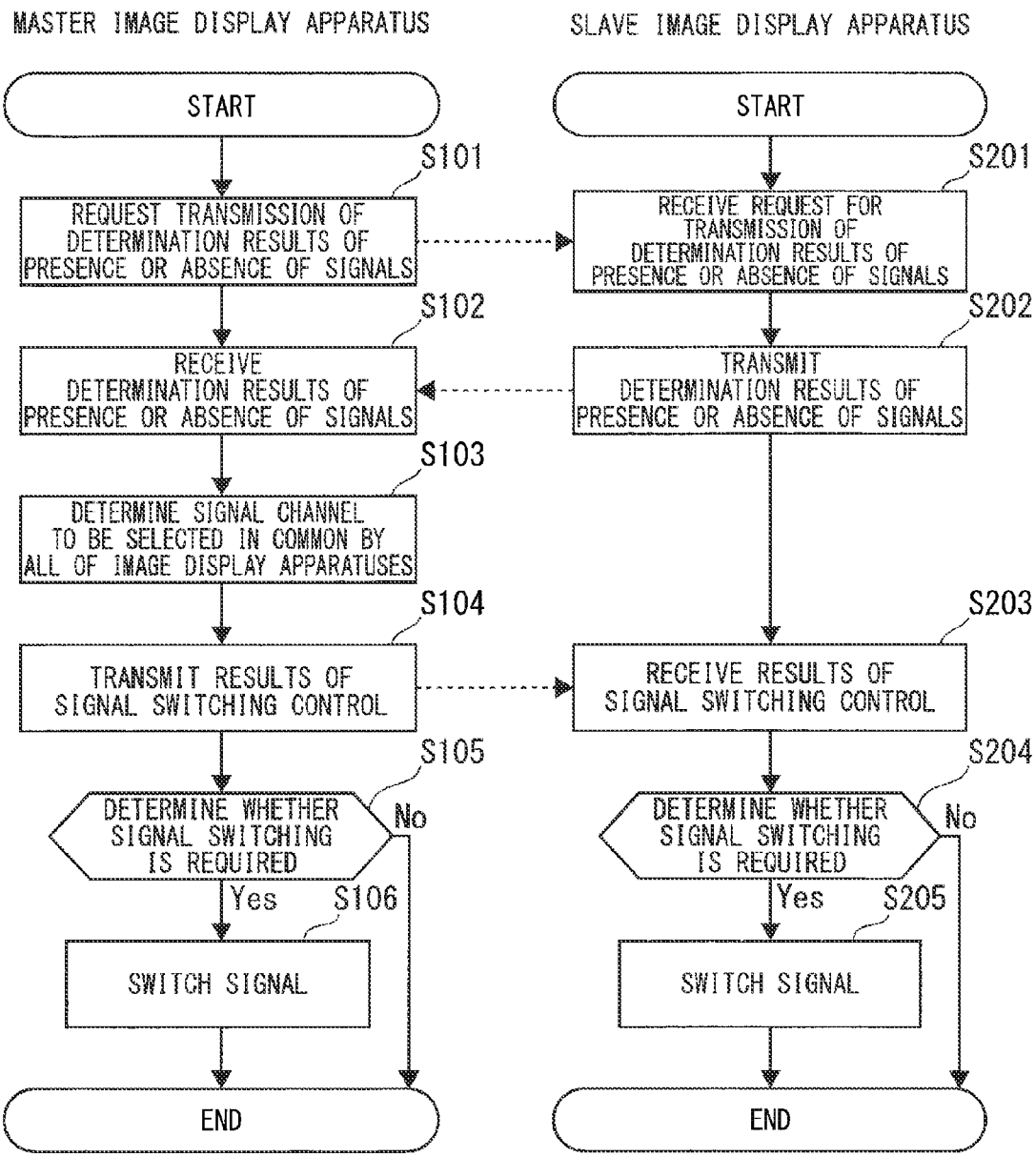
FIG. 7 is a flowchart showing an operation of the multi-screen display apparatus according to the first preferred embodiment.

FIG. 7 is a flowchart showing a method for controlling the video displaying of the multi-screen display apparatus according to this preferred embodiment. Assume that the video signals of, for example, three channels (first to third channels) are input to each of the image display apparatuses 100 that form the multi-screen display apparatus.

According to this preferred embodiment, the first, second, and third signal receivers 11, 12, and 13 of each of the image display apparatuses 100 receive video signals of the first, second, and third channels that indicate the letters "A," "B," and "C." Assume that the selectors 2 of all of the image display apparatuses 100 select, in the initial state, the video signals of the first channel input to the first signal receivers 11 as shown in FIG. 2. Consequently, the letter "A" is displayed on the entire screen of the multi-screen display apparatus as shown in FIG. 2.

As described above, the input detector 9 of each of the image display apparatuses 100 regularly determines the presence or absence of each video signal of the three channels input to the first, second, and third signal receivers 11, 12, and 13. The determination results are transmitted to the master image display apparatus 101 via the transceiver 14. The master image display apparatus 101 transmits, for example at intervals of one second, the request for the transmission of the determination results of the presence or absence of signals to the slave image display apparatuses 102 to 116 (Step S101). The slave image display apparatuses 102 to 116 receive the request for the transmission of the determination results of the presence or absence of signals (Step S201), and then, transmit the determination results of the presence or absence of signals to the master image display apparatus 101 (Step S202). The master image display apparatus 101 receives the determination results of the presence or absence of signals in the master image display apparatus 101 and the determination results of the presence or absence of signals in all of the slave image display apparatuses 102 to 116 (Step S102).

The following describes the control information transmitted, from the slave image display apparatuses 102 to 116, to the master image display apparatus 101. Firstly, the identification number of each of the image display apparatuses 100 is defined as n (n=1 to 16). The identification number n=1 corresponds to the master image display apparatus 101 and the identification numbers n=2 to 16 correspond to the slave image display apparatuses 102 to 116, respectively. For each of the image display apparatuses 100, Nosig1($n$), Nosig2($n$), and Nosing3($n$) denote the determination results of the presence or absence of video signals input to the first, second, and third receivers 11, 12, and 13. In addition, Sigsel(n) denotes the number of the input signal port currently selected by the selector 2 of each of the image display apparatuses 100.

Nosig1($n$), Nosig2($n$), and Nosig3($n$) stand at "0" in the presence of signals and "1" in the absence of signals. Sigsel (n) stands at 1, 2, or 3 corresponding to the number of the currently selected input signal port (the first, second, or third signal receiver 11, 12, or 13).

The master image display apparatus 101 obtains: the above-described information transmitted from the slave image display apparatuses 102 to 116; Nosig1(1), Nosig2(1), and Nosig3(1) that are the determination results of the presence or absence of signals in the master image display apparatus 101; and Sigsel(0) that is the number of the input signal port selected by the master image display apparatus 101.

Next, the master image display apparatus 101 decides a signal of which channel (Rsigsel) is selected in common by all of the image display apparatuses 100 on the basis of the information obtained from the master image display apparatus 101 and the slave image display apparatuses 102 to 116 (Step S103). Rsigsel stands at 1, 2, or 3 corresponding to the number of the input signal port.

In particular, Sigsel (n=1 to 16) is equal to 1 if a video signal of the first channel is currently selected by the multi-screen display apparatus as a whole. Nosig1($n$) (n=1 to 16) that stands at 0 for all of the image display apparatuses in this state indicates that there are no image display apparatuses 100 in which video signals of the first channel are absent in the multi-screen display apparatus. If this is the case, Rsigsel==Sgisel(1)=1 is provided, whereby the current displaying state is maintained.

Meanwhile, if Nosig1($n$) (n=1 to 16) is equal to 1 for one or some of the image display apparatuses 100, it is indicated that video signals of the first channel are absent in one or some of the image display apparatuses 100 in the multi-screen display apparatus. If this is the case, the controller 4 of the master image display apparatus 101 determines whether Nosig2($n$) (n=1 to 16) stands at 0 for all of the image display apparatuses 100. Nosign2($n$) that stands at 0 for all of the image display apparatuses indicates that video signals of the second channel are present in all of the image display apparatuses 100. If this is the case, the controller 4 of the master image display apparatus 101 provides Rsigsel=2.

In a case where Nosig2($n$) is equal to 1 for one or some of the image display apparatuses, the controller 4 of the master image display apparatus 101 determines whether Nosig3($n$) (n=1 to 16) stands at 0 for all of the image display apparatuses 100. Nosig3($n$) that stands at 0 for all of the image display apparatuses 100 indicates that video signals of the third channel are present in all of the image display apparatuses 100. If this is the case, the controller 4 of the master image display apparatus 101 provides Rsigsel=3.

If Nosig3($n$) is equal to 1 for one or some of the image display apparatuses 100, it is indicated that no video input of the same channel is present in common in all of the image display apparatuses 100. If this is the case, the controller 4 of the master image display apparatus 101 provides Rsigsel=1 (no change).

Next, the master image display apparatus 101 transmits Rsigsel, as the results of the signal switching control, to all of the slave image display apparatuses 102 to 116 (Step S104). Then, the controller 4 of the master image display apparatus 101 compares Sigsel(1) and Rsigsel to determine whether the video signal switching is required (Step S105).

In particular, if Sigsel(1) is not equal to Rsigsel, the controller 4 of the master image display apparatus 101 determines that the signal switching is required and controls the selector 2 to select a video signal of the channel corresponding to Rsigsel (Step S106). Then, Sigsel(1) is updated to the value of Rsigsel. If Sigsel(1) is equal to Rsigsel, meanwhile, the controller 4 of the master image display apparatus 101 determines that the video signal switching is not required.

The slave image display apparatus 102 receives the results of the signal switching control transmitted from the master image display apparatus 101 (Step S203). Then, the controller 4 of the slave image display apparatus 102 compares Sigsel(2) and Rsigsel to determine whether the video signal switching is required (Step S204). If Sigsel(2) is not equal to Rsigsel, the controller 4 of the slave image display apparatus 102 determines that the signal switching is required and controls the selector 2 to select a video signal of the channel corresponding to Rsigsel (Step S205). Then, Sigsel(2) is updated to the value of Rsigsel. If Sigsel(2) is equal to Rsigsel, meanwhile, the controller 4 of the slave image display apparatus 102 determines that the video signal switching is not required. Similarly, the other slave image display apparatuses 103 to 116 perform the operation described in Step S203 to S205.

Note that, Sigsel(n) that is equal to Rsigsel in Step S105 or Step S204 despite the absence of signals for the currently selected video input indicates that the common video cannot be displayed on the entire multi-screen. If this is the case, a mute display in, for example, full black screen is provided by the image display apparatus that receives no signals or a video signal of another channel that is present in the image display apparatus is selected and output.

Assume that the image display apparatus 100 having the identification number m provides Nosig1($m$)=1, Nosig2($m$)=0, Nosig3($m$)=1, and Sigsel(m)=1, and in this state, the master image display apparatus 101 provides the signal switching control of Rsigsel=1. In this case, the image display apparatus 100 having the identification number m selects and displays a video signal of the second channel that is present. At the same time, the image display apparatus 100 changes Sigsel(m)=1 into Sigsel(m)=2. In a case where the image display apparatus 100 having the identification number m provides Nosig1($m$)=1, Nosig2($m$)=1, Nosig3($m$)=1, and Sigsel(m)=1, and in this state, the master apparatus provides the signal switching control of Rsigsel=1, a mute display in, for example, full black screen is provided by the image display apparatus 100 having the identification number m and Sigsel(m) stands at 1 (no change).

As described above, in the multi-screen display apparatus according to the first preferred embodiment, the image display apparatus 100 serving as the master image display apparatus 101 receives the determination results of the presence or absence of signals in all of the image display apparatuses 101 to 116. The master image display apparatus 101 selects signals such that the multi-screen display apparatus on the whole can display video of the same channel at all times. Thus, even if the transmission of video signals of any one of the channels is stopped in some of the image display apparatuses 100 as a result of, for example, a break in a video signal cable, video of the same channel can be displayed on the entire multi-screen at all times, eliminating the possibility that a part of the video displayed on the entire multi-screen will be the video of a different channel.

Figure 8:
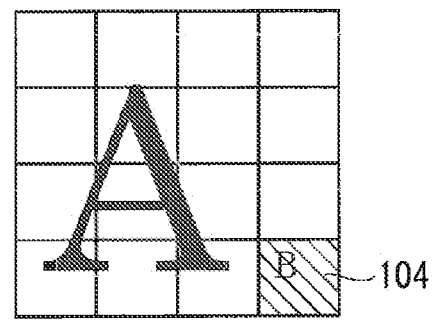
FIG. 8 illustrates a display example of a conventional multi-screen display apparatus.

For example, assume that the slave image display apparatus 104 fails to receive signals under the display condition shown in FIG. 2. As with a conventional technique, if the switching of input video is simply performed only in the slave display apparatus 104 such that a signal that is present is displayed, the display screen in FIG. 8 is provided. In this case, the displaying of the multi-screen display apparatus lacks unity on the whole.

According to the first preferred embodiment, meanwhile, in a case where the slave image display apparatus 104 fails to receive video signals, the switching of input video is performed such that the slave image display apparatus 104 displays a signal that is present and the other image display apparatuses (the master image display apparatus 101 and the slave image display apparatuses 102, 103, and 105 to 116) display the video of the same channel as that of the image display apparatus 104. Consequently, the unity can be maintained for the multi-screen display apparatus on the whole as shown in FIG. 3.

In this preferred embodiment, the plurality of image display apparatuses that form the multi-screen display apparatus are connected in series through the communication cables. This configuration allows the master image display apparatus 101 to communicate with the slave image display apparatuses 102 to 116. According to the first preferred embodiment, the master image display apparatus 101 automatically controls the video signal switching in each of the image display apparatuses 100 of the multi-screen display apparatus, thereby eliminating the need for monitoring and switching the input signal conditions in all of the image display apparatuses through an external controlling device. This provides the multi-screen display apparatus having a simple configuration that does not require such external controlling device.

According the first preferred embodiment, the image display apparatuses 100 receive video signals of three channels, which are not limited thereto. The image display apparatuses 100 are required to switch video signals of at least two channels.

<Effects>

The multi-screen display apparatus according to this preferred embodiment is the multi-screen display apparatus including the plurality of image display apparatuses 100 combined to form one screen. Any one of the plurality of image display apparatuses 100 is the master image display apparatus 101. The master image display apparatus 101 is connected with the plurality of image display apparatuses 100 other than the master image display apparatus 101. Each of the plurality of image display apparatuses 100 includes the video receiver 10 that receives an input of video signals of a plurality of channels, the input detector 9 that determines the presence or absence of input to the video receiver 10 for each of the video signals of the plurality of channels, the selector 2 that selects a video signal of one of the plurality of channels, the display that displays a video signal of the channel selected by the selector 2. The master image display apparatus 101 acquires determination results obtained by the input detector 9 and a video signal of which channel is selected by the selector 2 from each of the plurality of image display apparatuses 100 including the master image display apparatus 101. In a case where the selector 2 of any of the image display apparatuses 100 selects a video signal of the channel that is not input to the video receiver 10, the master image display apparatus 101 controls the selector 2 of the image display apparatus 100 to select a video signal of another channel that is input to the video receiver 10 and controls the selector 2 of at least one of the others of the image display apparatuses 100 to select a video signal of the other channel.

Thus, in a case where the transmission of video signals is stopped in any one of the plurality of image display apparatuses 100, the video signal in the image display apparatus 100 is switched to the video signal of another channel and the video signals in the other image display apparatuses 100 are also switched to the video signals of the same channel. Consequently, even if the transmission of video signals is stopped in any one of the plurality of image display apparatuses 100, another video signal can be displayed while the unity is maintained for the multi-screen on the whole.

In the multi-screen display apparatus according to this preferred embodiment, the master image display apparatus 101 controls the selectors of the plurality of image display apparatuses 100 including the master image display apparatus 101 to select a video signal of the same channel. In a case where the selector 2 of any of the image display apparatuses 100 selects a video signal of a channel that is not input to the video receiver 10, the master image display apparatus 101 controls the selector 2 of the image display apparatus 100 to select a video signal of another channel that is input to the video receiver 10 and controls the selectors 2 of all the other image display apparatuses 100 to select a video signal of the other channel.

Thus, the master image display apparatus 101 receives determination results of the presence or absence of signals in all of the image display apparatuses 100 and selects a signal channel such that the multi-screen display apparatus as a whole can display video of the same channel. The master image display apparatus 101 controls all of the image display apparatuses 100 to select a video signal of the same channel. Consequently, even if the transmission of video signals is stopped in some of the image display apparatuses as a result of, for example, a break in a video signal cable, the multi-screen display apparatus as a whole can display the same video at all times, eliminating the possibility that different video will be displayed on a part of the multi-screen.

Second Preferred Embodiment

Configuration

According to the first preferred embodiment, the master image display apparatus 101 controls the slave image display apparatuses 102 to 116 such that the multi-screen display apparatus as a whole displays video of the same channel through the display switching in the absence of signals. According to a second preferred embodiment, meanwhile, as shown in FIG. 5, the multi-screen of the multi-screen display apparatus is divided into groups of a plurality of areas and each group displays a different piece of video. This configuration is particularly intended for the multi-screen display apparatus in which a large number of image display apparatuses form the multi-screen. The multi-screen display apparatus and the image display apparatuses 100 according to this preferred embodiment have the same configuration as that of the first preferred embodiment (FIGS. 1 and 6), and a description thereof is omitted.

<Operation>

According to the second preferred embodiment, a group ID (hereinafter referred to as "GID") is set for each of the image display apparatuses 100. The master image display apparatus 101 performs the image switching processing for each group on the basis of the determination results of the presence or absence of signals. In the example shown in FIG. 9, GID=2 is set for the salve image display apparatuses 103, 104, 107, and 108 and GID=1 is set for the other image display apparatuses. The master image display apparatus 101 separately performs the video switching processing for the image display apparatuses with GID=1 and the image switching processing for the image display apparatuses with GID=2 on the basis of the determination results of the presence and absence of signals.

According to the second preferred embodiment, GID(n) is added to the information transmitted, from the slave image display apparatuses 102 to 116, to the master image display apparatus 101 in Step S102 of FIG. 7. As in the first preferred embodiment, n denotes the identification number (n=1 to 16) of each of the image display apparatuses 100. For example, GID(n) stands at 1 or 2 because the multi-screen in this preferred embodiment is divided into two groups.

As in the first preferred embodiment, the master image display apparatus 101 receives the determination results of the presence or absence of signals transmitted from the slave image display apparatuses 102 to 116 in Step S102 of FIG. 7.

Then, in Step S103, the master image display apparatus 101 decides a signal channel to be selected in common for each group. Thus, the control result Rsigsel (m): (m=GID(n)) is calculated for each GID.

Figure 9:
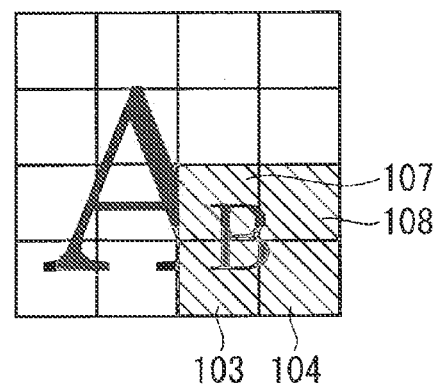
FIG. 9 illustrates a display example of the multi-screen display apparatus according to a second preferred embodiment.

In the example of FIG. 9, the master image display apparatus 101 calculates Rsigsel(1) from Nosig1(n), Nosig2(n), Nosig3(n), and Sigsel(n) of the group whose GID(n) is 1. The master image display apparatus 101 also calculates Rsigsel (2) from Nosig1(n), Nosig2(n), Nosig3(n), and Sigsel(n) of the group whose GID(n) is 2.

In Step S104, the control result Rsigsel(m) that has been calculated for each GID is transmitted to the slave image display apparatuses 102 to 116. Each of the image display apparatuses 100 performs the signal switching processing (Steps S105 and S106 or Steps S204 and S205) on the basis of Rsigsel(m) corresponding to its own GID.

Figure 10:
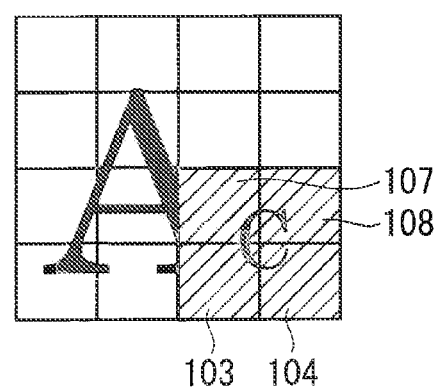
FIG. 10 illustrates a display example of the multi-screen display apparatus according to the second preferred embodiment.

In the example shown in FIG. 9, the image display apparatuses 100 with GID=1 select a first signal channel (the video illustrated as the letter "A") and the image display apparatuses with GID=2 select a second signal channel (the video illustrated as the letter "B"). That is, Rsigsel(1) stands at 1 and Rsigsel(2) stands at 2. Assume that the signal (of the second signal channel) selected by the salve image display apparatus 104 in this state disappears as a result of, for example, a break in a video signal cable. In this case, as a result of determination of the presence or absence of signals, the presence of signals is determined for the image display apparatuses 100 with GID=1, so that Rsigsel(1) remains at 1. For the slave image display apparatus 104 with GID=2, meanwhile, the absence of signals is determined as a result of the determination of the presence or absence of signals, so that Rsigsel(2) is changed from 2 to 3. Consequently, the video signal switching from the second channel to a third channel (the video illustrated as the letter "C") is performed only in the image display apparatuses 100 with GID=2, whereby the state shown in FIG. 10 is provided.

Thus, according to this preferred embodiment, GID is assigned to each of the image display apparatuses 100 of the multi-screen display apparatus and the master image display apparatus 101 performs the signal switching processing in the salve image display apparatuses 102 to 116 in units of groups. Consequently, in the absence of signals, the displaying can be switched such that each area defined in the display screen of the multi-screen display apparatus displays video of the same channel. According to the first preferred embodiment, the very large multi-screen configuration of, for example, a 10 by 5 matrix of screens requires the video signal setting of the same channel for a total of 50 image display apparatuses. According to the second preferred embodiment, meanwhile, the image display apparatuses are grouped into, for example, 2 by 2 matrices of screens, allowing for the common input video setting for each unit of screens that is smaller than the configuration of the entire multi-screen. Thus, the image display apparatuses 100 are grouped in advance, to thereby reduce the risk of failing to display the common video on the entire multi-screen in such a case of the disappearance of signals.

The image display apparatuses 100 of the multi-screen display apparatus, which are divided into two groups according to this preferred embodiment, may be divided into more than two groups.

<Effects>

In the multi-screen display apparatus according to this preferred embodiment, the plurality of display apparatuses 100 including the master image display apparatus 101 are divided into a plurality of groups in advance. The master image display apparatus 101 controls the selectors 2 of the plurality of image display apparatuses 100 for each of the plurality of groups to select a video signal of the same channel. In a case where the selector 2 of any of the image display apparatuses 100 that belong to one of the groups selects a video signal of a channel that is not input to the video receiver, the master image display apparatus 101 controls the selectors 2 of the image display apparatus 100 to select a video signal of another channel that is input to the video receiver 10 and controls the selectors 2 of all the other image display apparatuses 100 that belong to the one group to select a video signal of the other channel.

Thus, for the displaying of some pieces of video on the divided large screen of the multi-screen display apparatus, the plurality of image display apparatuses 100 are divided into groups in advance in accordance with the screen displaying, whereby the video signal switching control can be performed for each group. Consequently, if the absence of signals is detected simultaneously in some of the image display apparatuses, video that can be displayed in common is selected for each group that is smaller than the entire multi-screen. This can reduce the possibility that no common video will be selected when the absence of signals is detected.

In the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A multi-screen display system including a plurality of image display apparatuses whose screens are combined to form one screen, wherein the one screen is formed by a plurality of screens incorporated respectively in the plurality of display apparatuses, any one of said plurality of image display apparatuses is a master image display apparatus, said master image display apparatus is connected with said plurality of image display apparatuses other than said master image display apparatus, each of said plurality of image display apparatuses includes:

a video receiver that receives an input of video signals of a plurality of channels;

an input detector that determines the presence or absence of input into said video receiver for each of the video signals of said plurality of channels;

a selector that selects a video signal of one of said plurality of channels; and a display including a corresponding one of the plurality of screens that displays a video signal of the channel selected by said selector, said master image display apparatus acquires determination results obtained by said input detectors of said plurality of image display apparatuses, respectively, and acquires a video signal of which channel is selected by said selector from each of said plurality of image display apparatuses including said master image display apparatus, in a case where said selector of a given one of said plurality of image display apparatuses selects a video signal of a channel that is not input to said video receiver of at least one of said plurality of image display apparatuses, said master image display apparatus controls said selector of the given one of said plurality of image display apparatuses to select a video signal of another channel that is input to said video receiver of said at least one of said plurality of image display apparatuses and controls said selector of one or more others of said plurality of image display apparatuses to select a video signal of said another channel.

2. The multi-screen display system according to claim 1, wherein
said master image display apparatus controls said selectors of said plurality of image display apparatuses including said master image display apparatus to select a video signal of an identical channel, and
in a case where said selector of a particular one of said image display apparatuses selects a video signal of a channel that is not input to said video receiver of said particular one of said plurality of image display devices, said master image display apparatus controls said selector of said particular one of said plurality of image display apparatuses to select a video signal of a different channel that is input to said video receiver of said particular one of said plurality of image display devices and controls said selectors of all the others of said plurality image display apparatuses to select a video signal of said different channel.

3. The multi-screen display system according to claim 1, wherein
said plurality of image display apparatuses including said master image display apparatus are divided into a plurality of groups in advance,
said master image display apparatus controls said selectors of said plurality of image display apparatuses for each of said plurality of groups to select a video signal of an identical channel, and
in a case where said selector of a particular one of said image display apparatuses that belong to a particular one of the groups selects a video signal of a channel that is not input to said video receiver of said particular one of said image display apparatuses, said master image display apparatus controls said selector of said particular one of said plurality of image display apparatuses to select a video signal of a different channel that is input to said video receiver and controls said selectors of all the others of said plurality of image display apparatuses that belong to the particular one of said plurality of groups to select a video signal of said different channel.

4. The multi-screen display system of claim 1, wherein the outputs of the respective displays of the plurality of image display apparatuses are displayed with a substantially equal shape and size.

* * * * *